UNITED STATES PATENT OFFICE.

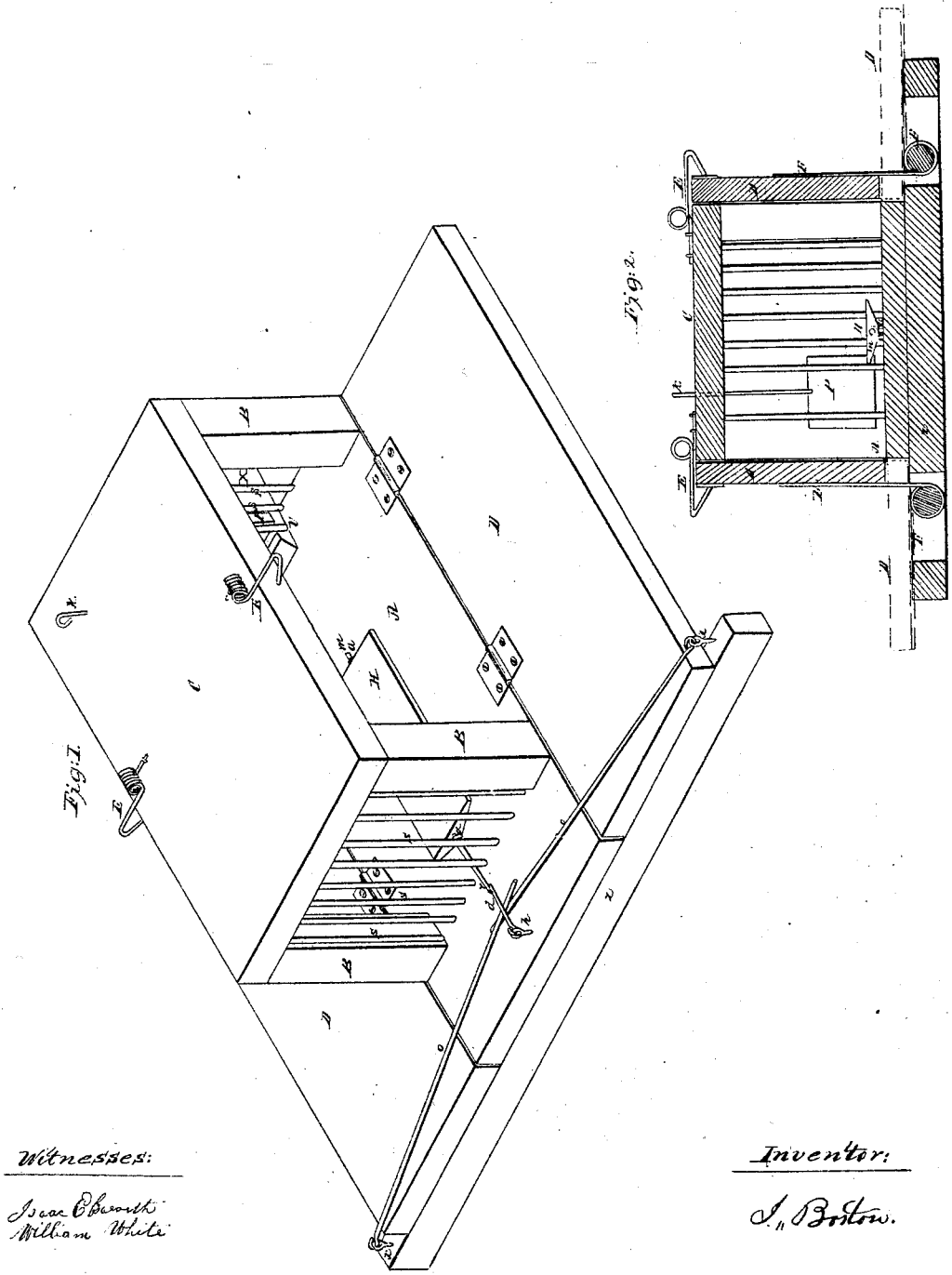

J. BORTON, OF MIDDLEBOURNE, OHIO.

RAT-TRAP.

Specification of Letters Patent No. 24,715, dated July 12, 1859.

*To all whom it may concern:*

Be it known that I, J. BORTON, of Middlebourne, in the county of Guernsey and State of Ohio, have invented a new and useful Improvement in Rat-Traps; and I do hereby declare that the following is a full, clear, and exact description of the same, reference being had to the accompanying drawings, forming a part of this specification, in which—

Figure 1, is a perspective view of the rat trap when set, and Fig. 2, is a transverse section of the same, when the doors are closed; the red lines also showing the position of the doors when open.

Similar letters of reference, in each of the several figures, indicate corresponding parts.

The nature of my invention consists in the employment of a combination of devices for closing the spring doors of a trap, constructed for the purpose of catching or securing rats or other similar animals, which devices are hereinafter more fully described.

To enable others, skilled in the art, to make and use my invention, I will proceed to describe its construction and operation.

A, is the floor or bottom part of the trap; C, the top and B, B, uprights for connecting the floor and top of the trap.

$s, s$, are bars or rods securely attached to the bottom and top of the trap at its ends; for the purpose of preventing the escape of the animal when caught.

D, D, are doors hinged as shown to the bottom piece A. Beneath the underside of the doors D, are spiral springs F, F, situated in the cross beam $z$, which press strongly against the doors for the purpose of closing them. Spring hooks E, E, are also placed on the top C, to press the doors more securely against the sides of the trap, when it is sprung and thus prevent the escape of the animal.

H, is a bait board elevated slightly above the bottom of the trap and suspended on the hooks $a, a$, by the rod $m$, and fastened at its ends, the bait board thus oscillating freely when the bait is disturbed.

$d$, is a dog connected as shown in the drawing, (see Fig. 1,) with the hook $h$, securely fastened to the floor of the trap.

$o, o$, are rods or wires loosely attached to the hooks $x, x$, the latter being fastened to the cross beam $z$, of the trap.

P, is a door in the rear of the trap, which connects with an open mouthed box, for allowing the egress of the animal from the trap when it is desired to destroy him. The door P, is raised and lowered through the rod K, which passes through the top of the trap.

In order to set the trap, the doors D, D, are pressed downward and the rods or wires $o, o$, are passed over them, as shown in Fig. 1; the dog $d$, is then made to pass over the wires $o, o$, and under the rod $r$, attached to the bait board; the trap will thus remain open for the reception of the animal until the bait board is disturbed. When the bait is touched, it will give an oscillating motion to the board H, which will cause the dog to slip from under the rod $r$, when there being no obstruction to the closing of the doors D, D, they will instantly be shut by the action of the springs F, F, and the animal will be secured.

It is well known that rats are extremely cunning and that it is difficult to entice them into the traps as ordinarily made, many of which are entirely or partially closed. In my invention, the bottom and sides of the trap when set, present the appearance of an ordinary floor and the ends being partially open, and the devices for operating the doors being mostly out of view of the bait which entices the animals, they will be more likely to be deceived than in the kinds of traps adverted to.

What I claim as my invention and desire to secure by Letters Patents, is—

The combination of the spring doors D, D, rods $o, o$, dog $d$, and rod $r$, when arranged substantially in the manner and for the purpose set forth.

J. BORTON.

Witnesses:
ISAAC ELSWORTH,
WILLIAM WHITE.